3,654,199
GRANULATED CORK AND CALCINED FOSSIL SILICA FILLER HOT TOP MATERIAL
Jean Bourette, 2 Impasse de la Voumonnaie, Dreux, France
No Drawing. Continuation-in-part of application Ser. No. 718,257, Apr. 2, 1968. This application Apr. 24, 1970, Ser. No. 31,729
Claims priority, application France, Apr. 21, 1967, 103,661
Int. Cl. C08b 27/04, 27/20; C08f 45/04, 45/20 C08g 51/18, 51/04
U.S. Cl. 260—17.2     6 Claims

ABSTRACT OF THE DISCLOSURE

The invention relates to a hot top or sprue plate material for ingot molds. The composition comprises calcined fossil silica filler mixed with granulated cork and agglomerated by means of a synthetic thermoplastic and/or thermosetting resin.

CROSS REFERENCE TO RELATED APPLICATION

This application is a continuation-in-part of my copending application Ser. No. 718,257, filed Apr. 2, 1968, for "Hot Top Material" now abandoned.

BACKGROUND OF THE INVENTION

There are several existing types of sprue plates or hot tops for ingot molds. The most widely used type is made of a mixture of porous concrete and a carbonizable substance such as sawdust. These plates, however, have several disadvantages including the following:

Their heat absorption is excessive since they include high density fillers such as sand which have a high specific heat.

In addition, the insulating power is insufficient. Usually porous concrete which is known commercially as "Siporex" is used. When the metal is poured into the mold, an endothermic reaction probably occurs in the concrete, absorbing the heat which should be retained in the upper part of the ingot mold.

Finally, sawdust which is used in the composition has hygroscopic properties which can alter the properties of the plates.

SUMMARY OF THE INVENTION

Generally speaking, the present invention comprises a sprue plate or hot top for an ingot mold made of a composition of calcined fossil silica filler mixed with granulated cork and agglomerated by means of synthetic thermoplastic and/or thermoseting resins.

It is a primary object of the present invention to provide improved sprue plates or hot tops of the type described to avoid the disadvantages of the brown sprue plates or hot tops and to improve the efficiency thereof.

It is a further object of the present invention to provide a sprue plate or hot top for ingot molds which are superior to the presently known sprue plates and hot tops for ingot molds.

Other objects and advantages of the present invention will be apparent from a further reading of the specification and of the appended claims.

With the above and other objects in view, the present invention mainly comprises a mixture of a calcined fossil silica filler such as kieselguhr and granulated cork, agglomerated by means of synthetic thermoplastic and/or thermosetting resins. The preferred proportions by weight are 40–60% fossil silica, 5–25% granulated cork and 15–30% synthetic resin.

By using the components of the present invention together, particularly advantageous results are obtained so that a sprue plate or hot top according to the invention avoids the disadvantages of the known such materials.

Thus, by replacing porous concrete with calcined fossil silica such as kieselguhr, no endothermic reaction occurs when the metal is poured into the mold. The insulating capacity of the plates is also increased.

However, it would not be satisfactory to use calcined fossil silica alone since its melting point is too low for the uses to which the plates are put. However, when the calcined fossil silica is mixed with granulated cork, effective heat barriers are produced which has the same effect as if the melting point of the slicia had been artificially raised.

To obtain the best results, the granules of cork should preferably be between about 1 and 3 mm. in size, and the amount of cork by weight in the overall composition should be between about 5 and 25%.

The silica in the composition should preferably be partly made up of very fine powder (in an amount of about 5–6% by weight) and partly of particles between about 0.01 and 1 mm. in size and making up about 40–55% by weight of the mixture.

The cork, which when vaporized leaves hardly any ash, leaves pores in the mixture which forms small insulating cushions and prevent heat from escaping. As a result, the silica apparently does not become hotter than its melting point and keeps all of its properties during pouring.

The mixture is agglomerated by means of a synthetic resin or synthetic resins, which have been used in the prior art for reducing the thickness of plates to its optimum value. It is preferred that the proportion by weight of the synthetic resin, which may be thermoplastic and/or thermosetting, is between about 15 and 30%.

In general, any thermoplastic and/or thermosetting resin can be used to agglomerate the silica-cork mixture for the purposes of the invention, although of course certain resins are preferred for reasons of economy, availability and easy handling. Among the preferred thermoplastic resins are polyvinyl acetates, polyvinyl chlorides, mixed polymers of polyvinyl acetate and polyvinyl chloride, polystyrenes, chloroprene polymers, polyvinylidene chlorides, isoprene polymers, polymethacrylates, polymethylmethacrylates, etc. Among the suitable thermosetting resins are phenol formaldehyde polymers, urea formaldehyde polymers, polyurethanes, glyptal resins, etc.

The most preferred resins are the polyvinyl acetates and polyvinyl chlorides because of their good mechanical resistance in the cold, their good holding properties upon stoving, and their relatively low cost. The phenol formaldehyde and urea formaldehyde resins are highly satisfactory because of their excellent holding properties upon heating, they prevent material from deforming during the pouring of the steel, and their relatively low price. The phenol formaldehyde resins are used in preference to urea formaldehyde resins because the flames are self-extinguished while the urea formaldehydes continue to burn. Moreover, their absorption of water is nil or negligible, while the urea formaldehyde can absorb up until 0.8% of water in 24 hours.

Although sprue plates made in accordance with the present invention as described above are more efficient than ordinary carbonizable plates, it may be advisable in some cases to replace some of the cork by other substances of similar type. The preferred substances are cellulose fibers such as flax, chopped rice straw, waste straw of various kinds or mineral fibers which can improve the skeleton structure of the plates. These fiber substances when used are preferably present in an amount of 5 to 10% by weight of the final mixture.

DESCRIPTION OF PREFERRED EMBODIMENTS

The following example is given to further illustrate the present invention. The scope of the invention is not, however, meant to be limited to the specific details of the example.

EXAMPLE

A sprue plate is prepared from the following composition, all percentages being by weight:

| | Percent |
|---|---|
| Porosil D | 53 |
| Porosil MP | 7 |
| Flax fibers | 10 |
| Cork granules | 10 |
| Rhodopas 6000 | 17 |
| Bakelite | 3 |

Rhodopas 6000 is a commercial polyvinyl acetate of molecular weight 6000.

Bakelite is a commercial phenol formaldehyde resin.

Porosil D is a calcined fossil silica of the following chemical composition:

| | Percent |
|---|---|
| $SiO_2$ | 93 |
| $Al_2O_3$ | 5 |
| CaO | 1 |
| MgO | 0.5 |
| Loss on firing | 0.5 |

The density of the substance unpacked is 0.4–0.5 and packed is 0.6–0.7. The particle size breakdown is as follows:

| Microns: | Percent |
|---|---|
| 50 | Traces |
| 80 | 50–60 |
| 160 | 30–40 |
| 40 | 10 |

Porosil MP is a calcined fossil silica of the following chemical composition:

| | Percent |
|---|---|
| $SiO_2$ | 80 |
| $Al_2O_3$ | 10 |
| CaO | 2 |
| MgO | 1 |
| Loss on firing | 7 |

The unpacked density is 0.10–0.15 and the packed density is 0.30. The particle size breakdown is as follows:

| Microns: | Percent |
|---|---|
| 0–5 | 40 |
| 5–10 | 13 |
| 10–20 | 16 |
| 20–30 | 6 |
| 30–50 | 8 |
| 50–100 | 10 |
| More than 100 microns | 7 |

The grain size of the cork is as follows:

| Microns: | Percent |
|---|---|
| Less than 100 | 5 |
| 100 | 10 |
| 500 | 20 |
| 1000 | 30 |
| 2000 | 25 |
| 3000 | 10 |

The resulting product has a satisfactory porosity for the elimination of the gas upon burning of the organic products.

While the invention has been described in particular with respect to a specific embodiment, it is apparent that variations thereof can be made without departing from the scope of the invention. In particular, small amounts of oxidation catalysts can be added in known manner and the plates can be covered with a layer of protective material to prevent impurities forming in the steel by separating out during pouring.

What is claimed is:

1. A sprue plate or hot top for ingot molds formed of a composition consisting essentially of calcined fossil silica filler in an amount of between about 40–60% by weight, granulated cork in an amount of between about 5–25% by weight, and synthetic resin in an amount of between about 15–30% by weight.

2. A sprue plate or hot top for ingot molds according to claim 1 and also including cellulose fibers.

3. A sprue plate or hot top for ingot molds according to claim 2 wherein a portion of the granulated cork is replaced by between about 5 and 10% by weight of cellulose fibers.

4. A sprue plate or hot top for ingot molds according to claim 2 wherein 40–50% by weight of the mixture is calcined fossil silica filler of a particle size between about 0.01 mm. and 1 mm. and the balance of the calcined fossil silica filler is in the form of fine powder.

5. A sprue plate or hot top for ingot molds according to claim 1 wherein the cork is of a particle size between about 1 and 3 mm.

6. A sprue plate or hot top for ingot molds according to claim 4 and wherein the particle size of the cork is between about 1 and 3 mm.

References Cited

UNITED STATES PATENTS

| 3,405,028 | 10/1968 | Nouveau | 260—17.2 |
| 3,300,322 | 1/1967 | De Geer | 106—38.35 |

FOREIGN PATENTS 1,032,356  6/1966  Great Britain.

OTHER REFERENCES

Chem. Abst., vol. 64: 405a, Mendelsohn, "Metallurgical Exothermic Mixture" and vol. 64:17144q, Doittau, "Exothermic Composition," 1965.

Chem. Abst., vol. 65:8542d, Snitker, "Fire Resistant Insulation," 1966.

Chem. Abst., vol. 66:48774v, Doittau, "Linings—Molds—," 1966.

Chem. Abst., vol. 66:66164a, Snogren, "Insulation ... Agent," 1967.

HAROLD D. ANDERSON, Primary Examiner

E. WOODBERRY, Assistant Examiner

U.S. Cl. X.R.

164—43; 260—9, 17.3, 17.4 R, 17.4 BB